(12) United States Patent
Miyaishi

(10) Patent No.: US 10,710,213 B2
(45) Date of Patent: Jul. 14, 2020

(54) ALUMINA SINTERED BODY, ABRASIVE GRAIN, AND GRINDING WHEEL

(71) Applicant: SHOWA DENKO K.K., Tokyo (JP)

(72) Inventor: So Miyaishi, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/484,733

(22) PCT Filed: Dec. 19, 2018

(86) PCT No.: PCT/JP2018/047989
§ 371 (c)(1),
(2) Date: Aug. 8, 2019

(87) PCT Pub. No.: WO2019/131817
PCT Pub. Date: Jul. 4, 2019

(65) Prior Publication Data
US 2020/0001432 A1     Jan. 2, 2020

(30) Foreign Application Priority Data

Dec. 25, 2017   (JP) .................. 2017-248428

(51) Int. Cl.
*B24D 3/14*      (2006.01)
*B24D 5/02*      (2006.01)
(Continued)

(52) U.S. Cl.
CPC ............... *B24D 7/02* (2013.01); *B24D 3/14* (2013.01); *B24D 3/18* (2013.01); *B24D 5/02* (2013.01); *B24D 18/00* (2013.01); *C04B 35/10* (2013.01)

(58) Field of Classification Search
CPC ... B24D 3/02; B24D 3/14; B24D 3/18; B24D 5/02; B24D 7/02; B24D 18/00;
(Continued)

(56) References Cited

U.S. PATENT DOCUMENTS 5,215,551 A    6/1993 Hatanaka et al.
5,387,268 A    2/1995 Hiraiwa et al.
(Continued)

FOREIGN PATENT DOCUMENTS

CN        1134692 A     10/1996
CN      104350025 A      2/2015
(Continued)

OTHER PUBLICATIONS

T. Koyama et al., "Effect of a small amount of liquid-forming additives on the microstructure of $Al_2O_3$ ceramics," Journal of Materials Science, 1993, pp. 5953-5956, vol. 28.
(Continued)

*Primary Examiner* — Eileen P Morgan
(74) *Attorney, Agent, or Firm* — Sughrue Mion, PLLC

(57) ABSTRACT

To provide an alumina sintered body, abrasive grains, and a grinding wheel having high hardness and excellent wear resistance. An alumina sintered body comprising: an inner layer comprising alumina crystal grains; and an outer layer covering at least a part of the inner layer from outside, having a higher content of an alkaline earth metal than the inner layer, and comprising alumina crystal grains, wherein the content of the alkaline earth metal in the outer layer is 1.0 to 30.0 mass % in terms of oxide, the alumina sintered body being free from silicon except unavoidable impurities.

7 Claims, 3 Drawing Sheets

(51) Int. Cl.
    *B24D 7/02*       (2006.01)
    *C04B 35/10*     (2006.01)
    *B24D 3/18*       (2006.01)
    *B24D 18/00*     (2006.01)

(58) Field of Classification Search
    CPC ....... C04B 35/01; C04B 35/10; C04B 35/111; C04B 35/113; C04B 35/117
    USPC .......................................... 451/540, 541, 547
    See application file for complete search history.

(56) References Cited

U.S. PATENT DOCUMENTS

| | | | |
|---|---|---|---|
| 5,593,467 A | | 1/1997 | Monroe |
| 5,645,618 A | | 7/1997 | Monroe et al. |
| 5,651,801 A | | 7/1997 | Monroe et al. |
| 8,877,966 B2 * | 11/2014 | Herzog ................. B01J 23/002 562/599 |
| 9,120,743 B2 * | 9/2015 | Peterson ............... C07C 67/347 |
| 2003/0232221 A1 | 12/2003 | Yamada et al. |
| 2006/0194690 A1 * | 8/2006 | Osuzu ................... C04B 35/117 501/127 |
| 2008/0199374 A1 * | 8/2008 | Tegman ................ C04B 35/113 422/241 |
| 2010/0093514 A1 | 4/2010 | Kanechika et al. |
| 2010/0243557 A1 * | 9/2010 | Tomita ............... B01D 67/0046 210/490 |
| 2012/0071687 A1 * | 3/2012 | Herzog ................. C07C 51/235 562/598 |
| 2013/0090229 A1 * | 4/2013 | Saito ......................... C04B 7/32 501/120 |
| 2013/0337725 A1 | 12/2013 | Monroe | |

FOREIGN PATENT DOCUMENTS

| | | |
|---|---|---|
| EP | 1 375 447 A1 | 1/2004 |
| JP | 07-136810 A | 5/1995 |
| JP | 09-87008 A | 3/1997 |
| JP | 2001-322865 A | 11/2001 |
| JP | 2004-026513 A | 1/2004 |
| JP | 2004-235341 A | 8/2004 |
| JP | 2004-307239 A | 11/2004 |
| JP | 2009-102181 A | 5/2009 |
| JP | 2009-203088 A | 9/2009 |
| JP | 2014-214064 A | 11/2014 |
| KR | 2000-0012006 A | 2/2000 |
| KR | 2003-0095238 A | 12/2003 |
| WO | 90/08744 A1 | 8/1990 |
| WO | 01/44133 A2 | 6/2001 |
| WO | 2011/069005 A2 | 6/2011 |

OTHER PUBLICATIONS

Written Opinon of the International Searching Authority of PCT/JP2018/047989 dated May 28, 2019.
International Search Report of PCT/JP2018/047989 dated May 28, 2019.
Notification of Reason for Refusal dated Dec. 23, 2019, issued by the Korean Intellectual Property Office in Application No. 10-2019-7024802.
First Office Action dated Jan. 2, 2020, issued by the China National Intellectual Property Administration in Application No. 201880015588.4.

* cited by examiner

[Fig. 1]
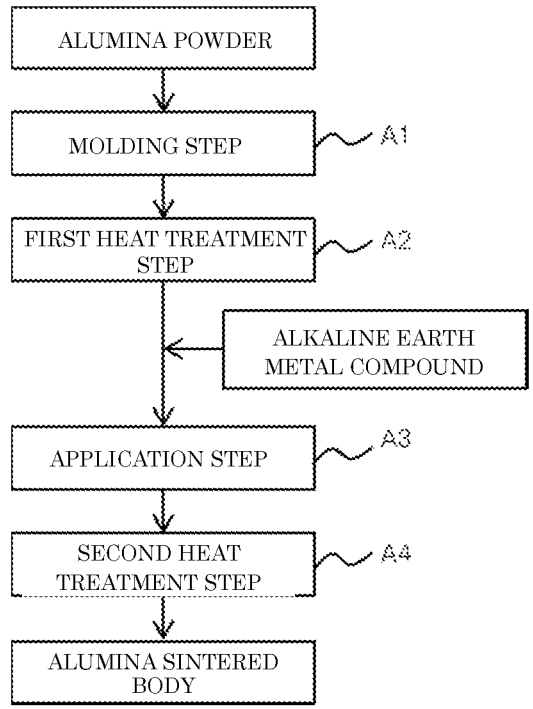
[Fig. 2]
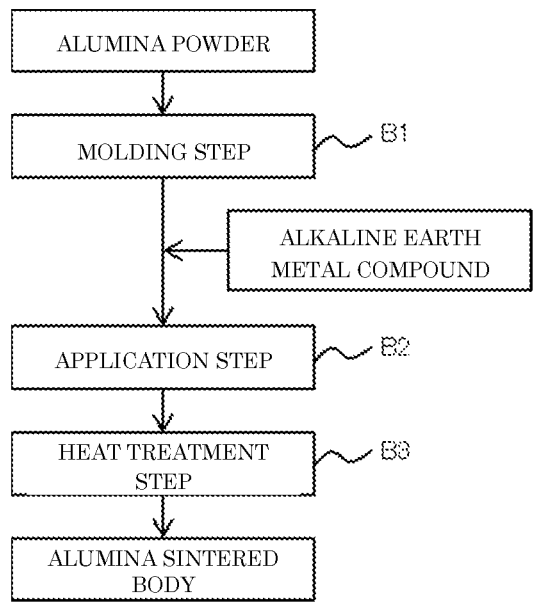

[Fig. 3]
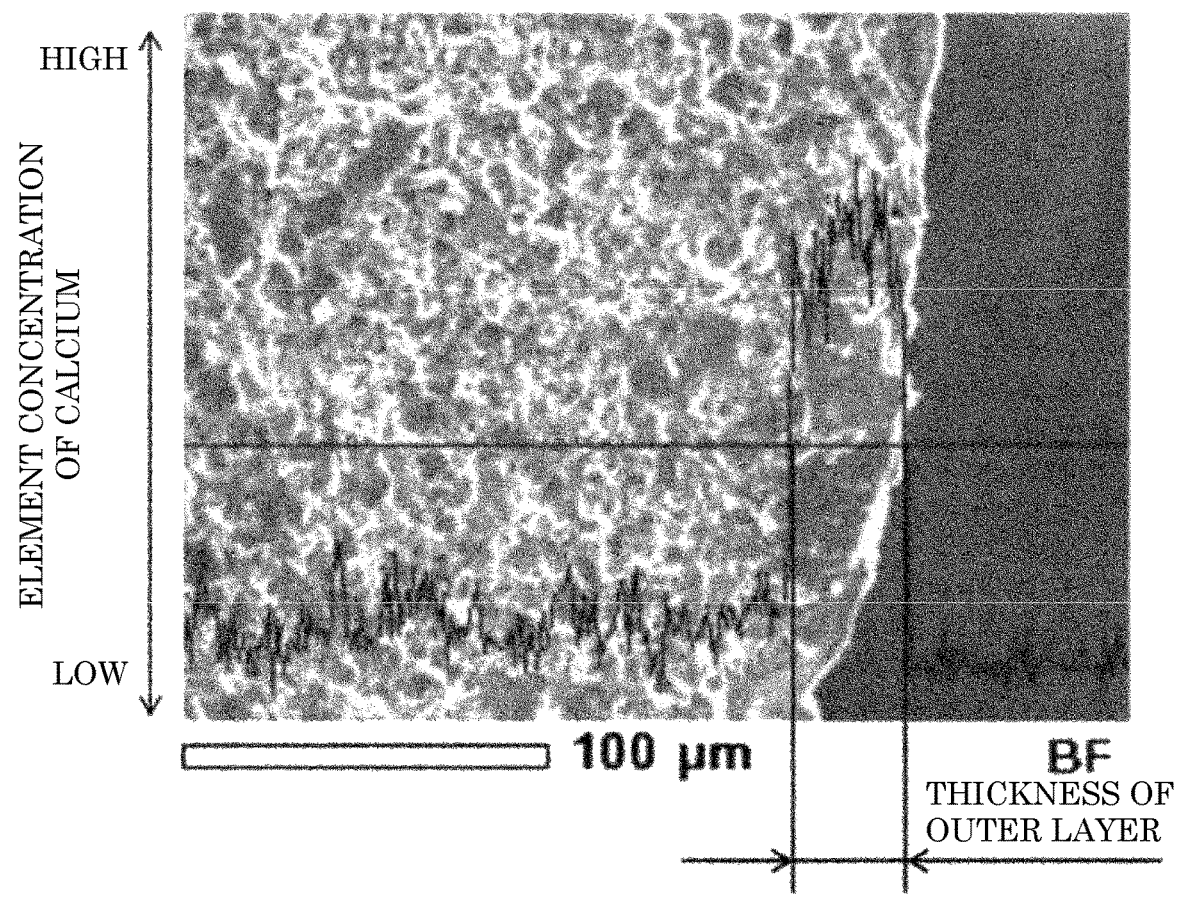

[Fig. 4]
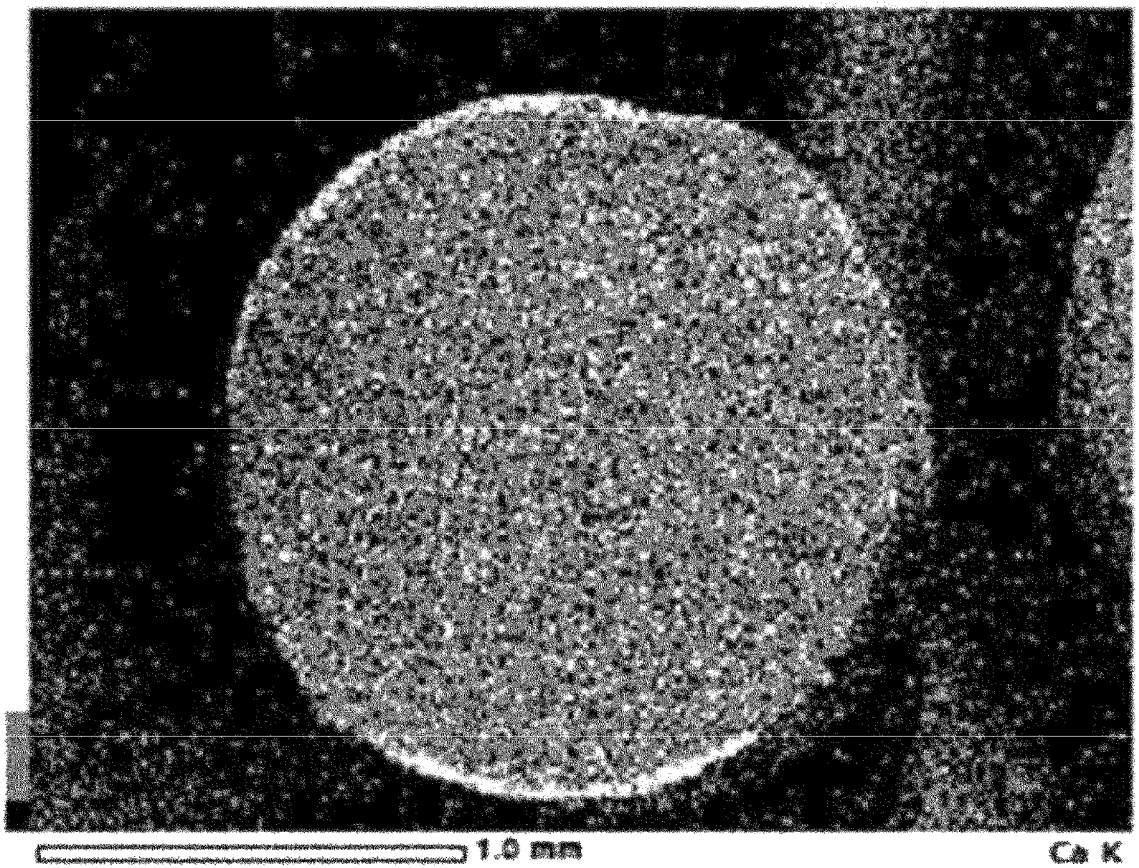

ALUMINA SINTERED BODY, ABRASIVE GRAIN, AND GRINDING WHEEL

CROSS REFERENCE TO RELATED APPLICATIONS

This application is a National Stage of International Application No. PCT/JP2018/047989 filed Dec. 19, 2018, claiming priority based on Japanese Patent Application No. 2017-248428 filed Dec. 25, 2017.

TECHNICAL FIELD

The present invention relates to an alumina sintered body, abrasive grains, and a grinding wheel, particularly to an alumina sintered body, abrasive grains, and a grinding wheel which comprise an alkaline earth metal element.

BACKGROUND ART

Alumina sintered bodies have been used in various industrial fields, making use of the feature of having excellent properties such as high hardness, high strength, high heat resistance, high wear resistance, and high chemical resistance. As one of such applications of alumina sintered bodies, a grinding wheel is mentioned.

Special alloys are often used as materials for parts constituting transportation equipment typified by automobiles or industrial machines. Since such special alloys are harder than normal SUS304 or the like, heavy-grinding wheels having a high "grinding ratio" which have not existed in the past are required in the market for processing these alloys. Here, the "grinding ratio" is an indicator showing the performance of grinding wheels and is represented by the following formula. A higher grinding ratio indicates higher performance of grinding wheels.

Grinding ratio=Amount of work materials ground (grinding amount)/Wear amount of grinding wheel   (A)

Generally, if many work materials can be ground with few grinding wheels, the performance is determined to be good, but the grinding ratio of a grinding wheel is affected by the hardness, the strength, and the toughness of abrasive grains used for the grinding wheel. Further, phenolic resins and the like are mainly used as binders, and therefore the abrasive grains are required also to have resin affinity. The following relationships are considered to exist between the grinding ratio and the hardness, between the grinding ratio and the strength or the toughness, and between the grinding ratio and the resin affinity:

(1) As the hardness of abrasive grains increase, the grinding amount also increases, and therefore the grinding ratio also increases;
(2) As the strength or the toughness increases, the amount of abrasive grains broken decreases, and therefore the grinding ratio increases; and
(3) As the resin affinity of abrasive grains increases, shedding of the abrasive grains from grinding wheels hardly occurs, and therefore the grinding ratio increases.

That is, the numerator in the formula of the grinding ratio is affected by the hardness of abrasive grains, and the denominator therein is affected by the strength or the toughness and the resin affinity of abrasive grains. In order to obtain a grinding wheel with a large grinding ratio, it is ideal to increase all of the hardness, the strength, the toughness, and the resin affinity.

For example, Patent Literature 1 discloses allowing a fine isotropic crystal and a crystal having an anisotropic shape to coexist by mixing a metal oxide having a eutectic point with $Al_2O_3$ of 1600° C. or less with $Al_2O_3$ powder, followed by firing using microwaves.

Further, Non Patent Literature 1 discloses that CaO and $SiO_2$ are uniformly co-doped in an alumina raw material in order to allow a plate-shaped alumina crystal having a large anisotropy to be contained in an alumina sintered body.

Further, Patent Literature 2 discloses layering an aluminum oxide material containing a crystal growth inhibitor and an aluminum oxide material containing a crystal growth promoter, followed by sintering the obtained laminate in one step.

Further, Patent Literature 3 discloses applying a solution or a slurry containing a magnesium compound to an aluminum oxide compact or a pre-sintered body, followed by main sintering. Patent Literature 3 discloses that a multilayer aluminum oxide sintered body in which the surface layer is composed of an equiaxed crystal with a small grain size, and the inside is composed of an anisotropic crystal can be obtained according to this production method.

Further, Patent Literature 4 discloses a multilayer alumina sintered body having an internal layer and a surface layer that contains silicon on the surface and has the same constituent crystalline phase as the internal layer, with their average crystal grain sizes being different from each other by 30% or more.

CITATION LIST

Patent Literature

PTL1: JP 09-87008 A
PTL2: JP 2004-26513 A
PTL3: JP 2004-307239 A
PTL4: JP 2009-102181 A

Non Patent Literature

NPTL1: J. Mat. Sci., 28 (1993) 5953-56

SUMMARY OF INVENTION

Technical Problem

In the disclosure according to Patent Literature 1, $TiO_2$ and MgO need to be solid-dissolved in the entire alumina crystal, and therefore the hardness of the alumina sintered body decreases. Further, the fine isotropic crystal and the crystal having an anisotropic shape coexist in both the surface and the inside of the sintered body, and therefore when required physical properties are different between the surface and the inside of the sintered body, it is difficult to obtain the desired performance only by controlling the ratio of the fine isotropic crystal and the crystal having an anisotropic shape.

When an aid to produce a liquid phase is uniformly added during sintering, as in Non Patent Literature 1, the aid remains in the grain boundary of the alumina sintered body, and the hardness and the strength at high temperature considerably decrease.

Since powder is layered in the production method according to Patent Literature 2, a sufficient two-layer structure cannot be obtained unless the thickness of the surface layer is 1 mm or more, and thus it is difficult to produce molded articles that are as small as used for abrasive grains.

In the production method according to Patent Literature 3, main sintering is performed after the magnesium compound is deposited on the aluminum oxide pre-sintered body, but there is room for further improvement in wear resistance of the alumina sintered body obtained by this production method, as in Comparative Example 3, which will be described below.

In the multilayer alumina sintered body according to Patent Literature 4, the hardness of the surface of the sintered body decreases due to silicon present on the surface of the sintered body.

Therefore, it is an object of the present invention to provide an alumina sintered body, abrasive grains, and a grinding wheel having high hardness and excellent wear resistance.

Solution to Problem

In order to achieve the aforementioned object, the present invention has any one of configurations [1] to [7] described below:

[1] An alumina sintered body comprising: an inner layer comprising alumina crystal grains; and an outer layer covering at least a part of the inner layer from outside, having a higher content of an alkaline earth metal than the inner layer, and comprising alumina crystal grains, wherein the content of the alkaline earth metal contained in the outer layer is 1.0 to 30.0 mass % in terms of oxide, the alumina sintered body being free from silicon except unavoidable impurities.

[2] The alumina sintered body according to [1], wherein a content of the alkaline earth metal in the entire alumina sintered body is 0.05 to 4.8 mass % in terms of oxide.

[3] The alumina sintered body according to [1] or [2], wherein the outer layer has a thickness of 1 to 100 μm.

[4] The alumina sintered body according to any one of [1] or [3], wherein the outer layer covers 25% or more of the surface of the inner layer.

[5] The alumina sintered body according to any one of [1] to [4], comprising: a compound represented by formula (1) below:

$$M_{1+x}Al_{12+y}O_{19+z} \quad (1)$$

wherein M is at least one selected from the group consisting of calcium, strontium and barium, and −0.3<x<0.3, −1.5<y<1.5, −2.0<z<2.0, and 2x+3y=2z are satisfied.

[6] An abrasive grain comprising the alumina sintered body according to any one of [1] to [5].

[7] A grinding wheel comprising a layer of the abrasive grain according to [6] on a working surface.

Advantageous Effect of Invention

The present invention can provide an alumina sintered body, abrasive grains, and a grinding wheel having high hardness and excellent wear resistance.

BRIEF DESCRIPTION OF DRAWINGS

FIG. 1 is a flowchart showing an example of a method for producing an alumina sintered body of an embodiment of the present invention.

FIG. 2 is a flowchart showing an another example of a method for producing an alumina sintered body of an embodiment of the present invention.

FIG. 3 is a SEM image of a fracture surface of an alumina sintered body of Example 3 and a graph showing the concentration of calcium detected by EDS at points corresponding to the image.

FIG. 4 is an element mapping image of the fracture surface of the alumina sintered body of Example 3 by EDS.

DESCRIPTION OF EMBODIMENTS

Hereinafter, an embodiment of the present invention will be described in detail, but the present invention is not limited to the following embodiments. In the following description, the phrase "A to B" referring to a numerical range indicates a numerical range including A and B that are the end points. That is, it means a numerical range of "A or more and B or less" (in the case of A<B) or "A or less and B or more" (in the case of A>B).

In the following description, "alkaline earth metals" mean calcium, strontium, and barium. Further, the description of element names such as calcium, strontium, and barium collectively refers to such elements contained in a single substance, a compound, or a mixture, unless otherwise described.

The "content (mass %)" of a target component is a numerical value indicating the amount of the target component as a percentage based on the total amount of a plurality of components including the target component. The amount or the content of the target component in terms of oxide means the amount or the content when each target component is converted into an oxide (such as CaO, SrO, and BaO having an oxidation number of 2 in the case of alkaline earth metals).

The "median diameter ($d_{50}$)" means a 50% grain size in a volume-based cumulative grain size distribution measured using a laser diffraction particle size analyzer.

[1. Alumina Sintered Body]

The alumina sintered body of this embodiment comprises an inner layer comprising alumina crystal grains and an outer layer covering at least a part of the inner layer from outside, having a higher content of an alkaline earth metal than the inner layer, and comprising alumina crystal grains Even in the case where the alkaline earth metal is one or two selected from the group consisting of calcium, strontium, and barium, other alkaline earth metals may be contained as unavoidable impurities. Further, since the alumina sintered body of this embodiment is free from silicon except unavoidable impurities, the alumina sintered body of this embodiment can suppress a reduction in hardness. The unavoidable impurities herein mean unavoidable impurities contained in starting materials or components inevitably incorporated during the production process.

The content of the alkaline earth metal in the entire alumina sintered body of this embodiment is preferably 0.05 mass % or more in terms of oxide. The content of the alkaline earth metal in the outer layer, which will be described below, can be made sufficient by setting the content of the alkaline earth metal in the alumina sintered body of this embodiment to 0.05 mass % or more in terms of oxide. From this reason, the content of the alkaline earth metal in the alumina sintered body of this embodiment is more preferably 0.10 mass % or more, further preferably 0.20 mass % or more, in terms of oxide.

Further, the content of the alkaline earth metal in the entire alumina sintered body of this embodiment is preferably 4.8 mass % or less in terms of oxide. Containing an excess amount of the alkaline earth metal inside the alumina sintered body can be suppressed by setting the content of the alkaline earth metal in the alumina sintered body of this embodiment to 4.8 mass % or less in terms of oxide. From this reason, the content of the alkaline earth metal is more preferably 3.8 mass % or less, further preferably 2.9 mass % or less.

The alumina sintered body of this embodiment may contain elements other than aluminum and the element contained in the alkaline earth metal without significantly inhibiting the effects of the present invention. In the alumina sintered body of this embodiment, the content of the elements other than aluminum and the element contained in the alkaline earth metal is preferably 10 mass % or less, more preferably 5 mass % or less, further preferably 3 mass % or less, in terms of oxide. Examples of the elements other than aluminum and the element contained in alkaline earth metal include titanium, sodium, silicon, iron, chromium, and zirconium. The content of beryllium and magnesium is not particularly limited as long as the object of the present invention can be achieved, but these components are preferably not contained except unavoidable impurities.

The alumina sintered body of this embodiment has a relative density of preferably 90% or more, more preferably 93% or more, further preferably 95% or more. A relative density of 90% or more can reduce pores and voids which serve as fracture starting points in the alumina sintered body. The relative density can be determined by dividing the bulk density of the alumina sintered body measured using the Archimedes method by the true density. Further, the shape of the alumina sintered body is not specifically limited.

The configuration of the compound contained in the alumina sintered body may be a configuration in which the alkaline earth metal element is dissolved in corundum crystal, but is preferably a configuration containing a compound represented by formula (1) below. Thereby, a grinding tool or a grinding wheel with a higher grinding ratio can be obtained.

$$M_{1+x}Al_{12+y}O_{19+z} \quad (1)$$

wherein M is preferably at least one selected from the group consisting of calcium, strontium and barium, and the relationship of x, y, and z preferably satisfies $-0.3<x<0.3$, $-1.5<y<1.5$, $-2.0<z<2.0$, and $2x+3y=2z$.

In formula (1), M is more preferably at least one selected from the group consisting of calcium and barium. Further, the relationship of x, y, and z more preferably satisfies $-0.2<x<0.2$, $-1.0<y<1.0$, and $-1.5<z<1.5$, further preferably $x=y=z=0$.

The compound represented by formula (1) is preferably at least one selected from the group consisting of $Ca_{0.717}Al_{11.043}O_{17.282}$, $Ca_{0.75}Al_{11}O_{17.25}$, $Ca_{0.79}Al_{10.9}O_{17.14}$, $Ca_{0.83}Al_{11}O_{17.33}$, $Ca_{0.857}Al_{10.917}O_{17.232}$, $CaAl_{12}O_{19}$, $CaAl_{13.2}O_{20.8}$, $Ca_{1.157}Al_{10.668}O_{17.159}$, $Sr_{0.717}Al_{11.043}O_{17.282}$, $Sr_{0.75}Al_{11}O_{17.25}$, $Sr_{0.79}Al_{10.9}O_{17.14}$, $Sr_{0.83}Al_{11}O_{17.33}$, $Sr_{0.857}Al_{10.917}O_{17.232}$, $SrAl_{12}O_{19}$, $SrAl_{13.2}O_{20.8}$, $Sr_{1.157}Al_{10.668}O_{17.159}$, $Ba_{0.717}Al_{11.043}O_{17.282}$, $Ba_{0.75}Al_{11}O_{17.25}$, $Ba_{0.79}Al_{10.9}O_{17.14}$, $Ba_{0.83}Al_{11}O_{17.33}$, $Ba_{0.857}Al_{10.917}O_{17.232}$, $BaAl_{12}O_{19}$, $BaAl_{13.2}O_{20.8}$, and $Ba_{1.157}Al_{10.668}O_{17.159}$, more preferably at least one selected from the group consisting of $Ca_{0.717}Al_{11.043}O_{17.282}$, $Ca_{0.75}Al_{11}O_{17.25}$, $Ca_{0.79}Al_{10.9}O_{17.14}$, $Ca_{0.83}Al_{11}O_{17.33}$, $Ca_{0.857}Al_{10.917}O_{17.232}$, $CaAl_{12}O_{19}$, $CaAl_{13.2}O_{20.8}$, $Ca_{1.157}Al_{10.668}O_{17.159}$, $Ba_{0.717}Al_{11.043}O_{17.282}$, $Ba_{0.75}Al_{11}O_{17.25}$, $Ba_{0.79}Al_{10.9}O_{17.14}$, $Ba_{0.83}Al_{11}O_{17.33}$, $Ba_{0.857}Al_{10.917}O_{17.232}$, $BaAl_{12}O_{19}$, $BaAl_{13.2}O_{20.8}$, and $Ba_{1.157}Al_{10.668}O_{17.159}$.

<1-1. Inner Layer>

The content of alumina in the inner layer of the alumina sintered body of this embodiment is preferably 80 mass % or more, more preferably 90 mass % or more, further preferably 95 mass % or more, particularly preferably 99 mass % or more. The inner layer preferably has a corundum crystal structure. Chemical components of the inner layer are, for example, the chemical components of the alumina abrasive material described in JIS R6111 (artificial abrasive material).

The inner layer may contain an alkaline earth metal element. However, the content of alkaline earth metal element in the inner layer is preferably 0.50 mass % or less, more preferably 0.40 mass % or less, further preferably 0.30 mass % or less, in terms of oxide. When the content of the alkaline earth metal element in the inner layer is 0.50 mass % or less in terms of oxide, the strength and the hardness of the inner layer are considered to be higher.

<1-2. Outer Layer>

The content of alumina in the outer layer of the alumina sintered body of this embodiment is preferably 60 mass % or more, more preferably 70 mass % or more, further preferably 80 mass % or more.

The content of the alkaline earth metal in the outer layer is 1.0 to 30.0 mass % in terms of oxide. When the content of the alkaline earth metal in the outer layer is 1.0 mass % or more in terms of oxide, the toughness of the outer layer and the resin affinity of the alumina sintered body are more enhanced. Further, when the content of the alkaline earth metal in the outer layer is 30.0 mass % or less in terms of oxide, the physical properties such as hardness and strength that are originally possessed by the alumina sintered body are not significantly impaired. The content is preferably 3.0 to 27.0 mass %, more preferably 5.0 to 25.0 mass %.

The proportion of the area covered by the outer layer to the surface area of the inner layer (which will be hereinafter referred to as "coverage by the outer layer") needs only to be 5% or more but is preferably 25% or more, more preferably 30% or more, further preferably 50% or more, particularly preferably 70% or more, most preferably 90% or more. Detailed specific examples of the methods for measuring and calculating the coverage by the outer layer will be described below in Examples.

The thickness of the outer layer is preferably 1 to 100 μm, more preferably 3 to 80 μm, further preferably 5 to 70 μm. When the thickness of the outer layer is 1 μm or more, the toughness of the outer layer and the resin affinity of the alumina sintered body can be increased. Further, when the thickness of the outer layer is 100 μm or less, high hardness as the alumina sintered body can be maintained. The thickness of the outer layer can be measured, for example, from the analysis results of the alkaline earth metal element by energy-dispersive X-ray spectroscopy, and specific examples of the measurement method will be described below in Examples.

<1-3. Silicon as Unavoidable Impurities>

The alumina sintered body of this embodiment is free from silicon except unavoidable impurities. In order to ensure a sufficient hardness, the acceptable content of silicon as unavoidable impurities in the alumina sintered body is 0.7 mass % or less in terms of $SiO_2$ that is an oxide. From this reason, the content of silicon in the alumina sintered body is more preferably 0.5 mass % or less, further preferably 0.3 mass % or less, in terms of oxide.

[2. Method for Producing Alumina Sintered Body 1]

FIG. 1 is a flowchart showing an example of a method for producing an alumina sintered body of the embodiment of the present invention. This production method includes a molding step A1 of fabricating an alumina compact from alumina powder, a first heat treatment step A2 of subjecting the alumina compact obtained in the molding step A1 to heat treatment, an application step A3 of applying an alkaline earth metal compound to the surface of the alumina sintered body obtained in the first sintering step A2 (which will be hereinafter referred to as an alumina sintered body raw material so as to be distinguished from an alumina sintered body as a product), and a second heat treatment step A4 of subjecting the alumina sintered body raw material to which the alkaline earth metal compound has been applied to heat treatment. In an example of this production method, the molding step A1 may be omitted when an alumina compact can be prepared in advance, and the molding step A1 and the first heat treatment step A2 may be omitted when an alumina sintered body raw material can be prepared in advance.

<Molding step A1>

The content of alumina in the alumina powder used in the molding step A1 is preferably 80 mass % or more, more preferably 90 mass % or more, further preferably 95 mass % or more, particularly preferably 99 mass % or more. Further, the alumina powder is free from silicon except unavoidable impurities. The alumina powder is preferably purified, for example, by the Bayer process. Further, the median diameter ($d_{50}$) of the alumina powder is preferably 3 μm or less, more preferably 1 μm or less.

Examples of the method for molding the alumina powder include die pressing, cold isostatic pressing, casting, injection molding, and extrusion, and the method can be appropriately selected depending on the conditions such as the properties, shape, size, or the like of the alumina compact to be fabricated, or the production equipment. When the alumina sintered body is used as abrasive grains, extrusion is preferable.

<First Heat Treatment Step A2>

In order to obtain a dense alumina sintered body, the heat treatment temperature for the alumina compact in this step is preferably 1200° C. or more, more preferably 1200 to 1800° C., further preferably 1300 to 1750° C., particularly preferably 1400 to 1700° C. Sintering of the alumina compact proceeds by setting the firing temperature to 1200° C. or more, so that a dense alumina sintered body raw material is obtained. Necking between the alumina compacts can be suppressed by setting the firing temperature to 1800° C. or less, so that an alumina sintered body raw material having a desired shape can be obtained. Further, the heat treatment atmosphere may be any one of atmospheric air, inert atmosphere and vacuum, preferably atmospheric air. Any combination of the firing temperature and the firing atmosphere above can be applied.

In this step, the temperature within the aforementioned range is preferably retained for 5 to 300 minutes. It is more preferable to maintain the temperature for 10 to 180 minutes, further preferably for 30 to 120 minutes. When the retention time is 5 minutes or more, a dense sintered body is obtained, and when the retention time is 300 minutes or less, the crystal grain size of the alumina crystal grains contained in the inner layer can be maintained to be small.

Examples of the heat treatment method in this step include a method for subjecting the alumina compact put in a container such as a sagger to heat treatment in an electric furnace such as a muffle furnace or a tunnel-type continuous firing furnace, and a method for subjecting the alumina compact directly to heat treatment in a firing apparatus such as a rotary kiln.

The relative density of the alumina sintered body raw material obtained in the first heat treatment step A2 is preferably 90% or more, more preferably 93% or more, further preferably 95% or more. The relative density is 90% or more. Fracture starting points can be reduced by reducing pores and voids in the alumina sintered body raw material. The relative density can be determined by dividing the bulk density of the sintered body measured using the Archimedes method by the true density. Further, the shape of the alumina sintered body raw material is not specifically limited.

<Application Step A3>

Examples of the method for applying the alkaline earth metal compound to the surface of the alumina sintered body raw material in the application step A3 include a method for spraying a dispersion or a solution of the alkaline earth metal compound to the alumina sintered body raw material. According to this method, it is easy to control the amount of the alkaline earth metal compound to be applied to the alumina sintered body raw material, and it is easy to make the application amount uniform. The method for applying the alkaline earth metal compound to the surface of the alumina sintered body raw material is not limited thereto and needs only to enable the alkaline earth metal compound to deposit on the surface of the alumina sintered body raw material, as in brush coating, dipping, and the like.

The alkaline earth metal compound to be applied in the application step A3 is at least one selected from the group consisting of calcium compounds, strontium compounds, and barium compounds.

Examples of the calcium compounds include calcium oxide, calcium fluoride, calcium chloride, calcium chlorate, calcium perchlorate, calcium hypochlorite, calcium bromide, calcium bromate, calcium iodide, calcium iodate, calcium nitrate, calcium nitrite, calcium sulfate, calcium sulfite, calcium thiosulfate, calcium bisulfate, calcium bisulfite, amide calcium sulfate, calcium dithionate, calcium tetrathionate, calcium hydroxide, calcium carbonate, calcium bicarbonate, calcium phosphate, calcium diphosphate, calcium superphosphate, calcium hypophosphate, calcium metaphosphate, calcium hydrogen phosphate, calcium dihydrogen phosphate, calcium dihydrogen diphosphate, calcium phosphide, calcium monophosphide, calcium borate, calcium metaborate, calcium tetrafluoroborate, calcium formate, calcium acetate, calcium propionate, calcium butyrate, calcium laurate, calcium myristate, calcium palmitate, calcium stearate, calcium oleate, calcium malate, calcium hydrogen malate, calcium citrate, calcium hydrogen citrate, calcium benzoate, calcium phthalate, calcium salicylate, calcium oxalate, calcium malonate, calcium succinate, calcium fumarate, calcium maleate, calcium tartrate, calcium bitartrate, calcium hippurate, calcium lactate, calcium gluconate, calcium phosphinate, calcium phosphonate, calcium hydrogen phosphonate, calcium methoxide, calcium ethoxide, calcium phenoxide, calcium hydroxide methoxide, calcium sulfide, calcium benzene sulfonate, calcium amide, calcium imide, and calcium azide.

Examples of the strontium compounds include strontium oxide, strontium fluoride, strontium chloride, strontium chlorate, strontium perchlorate, strontium hypochlorite, strontium bromide, strontium bromate, strontium iodide, strontium iodate, strontium nitrate, strontium nitrite, strontium sulfate, strontium sulfite, strontium thiosulfate, strontium bisulfate, strontium bisulfite, amide strontium sulfate, strontium dithionate, strontium tetrathionate, strontium hydroxide, strontium carbonate, strontium bicarbonate, strontium phosphate, strontium diphosphate, strontium hypophosphite, strontium metaphosphate, strontium hydrogen phosphate, strontium dihydrogen phosphate, strontium dihydrogen diphosphate, strontium phosphide, strontium monophosphide, strontium borate, strontium metaborate, strontium tetrafluoroborate, strontium formate, strontium acetate, strontium propionate, strontium butyrate, strontium laurate, strontium myristate, strontium palmitate, strontium stearate, strontium oleate, strontium malate, strontium hydrogen malate, strontium citrate, strontium hydrogen citrate, strontium benzoate, strontium phthalate, strontium salicylate, strontium oxalate, strontium malonate, strontium succinate, strontium fumarate, strontium maleate, strontium tartrate, strontium bitartrate, strontium hippurate, strontium lactate, strontium gluconate, strontium phosphinate, strontium phosphonate, strontium hydrogen phosphonate, strontium methoxide, strontium ethoxide, strontium phenoxide, strontium hydroxide methoxide, strontium sulfide, strontium benzene sulfonate, strontium amide, strontium imide, and strontium azide.

Examples of the barium compounds include barium oxide, barium fluoride, barium chloride, barium chlorate, barium perchlorate, barium hypochlorite, barium bromide, barium bromate, barium iodide, barium iodate, barium nitrate, barium nitrite, barium sulfate, barium sulfite, barium thiosulfate, barium bisulfate, barium bisulfite, amide barium sulfate, barium dithionate, barium tetrathionate, barium hydroxide, barium carbonate, barium bicarbonate, barium phosphate, barium diphosphate, barium hypophosphite, barium metaphosphate, barium hydrogen phosphate, barium dihydrogen phosphate, barium dihydrogen diphosphate, barium phosphide, barium monophosphide, barium borate, barium metaborate, barium tetrafluoroborate, barium formate, barium acetate, barium propionate, barium butyrate, barium laurate, barium myristate, barium palmitate, barium stearate, barium oleate, barium malate, barium hydrogen malate, barium citrate, barium hydrogen citrate, barium benzoate, barium phthalate, barium salicylate, barium oxalate, barium malonate, barium succinate, barium fumarate, barium maleate, barium tartrate, barium bitartrate, barium hippurate, barium lactate, barium gluconate, barium phosphinate, barium phosphonate, barium hydrogen phosphonate, barium methoxide, barium ethoxide, barium phenoxide, barium hydroxide methoxide, barium sulfide, barium benzene sulfonate, barium amide, barium imide, and barium azide. Among these, more preferable examples of the compounds include at least one selected from the group consisting of calcium oxide, calcium chloride, calcium acetate, calcium nitrate, calcium sulfate, strontium oxide, strontium chloride, strontium acetate, strontium nitrate, strontium sulfate, barium oxide, barium chloride, barium acetate, barium nitrate and barium sulfate, preferably calcium oxide, calcium chloride, calcium nitrate, calcium sulfate, calcium hydroxide, calcium carbonate, calcium formate, calcium acetate, calcium stearate, calcium lactate, calcium gluconate, strontium oxide, strontium chloride, strontium nitrate, strontium sulfate, strontium hydroxide, strontium carbonate, strontium formate, strontium acetate, strontium stearate, strontium lactate, strontium gluconate, barium oxide, barium chloride, barium nitrate, barium sulfate, barium hydroxide, barium carbonate, barium formate, barium acetate, barium stearate, barium lactate, and barium gluconate.

These compounds may be anhydrides or hydrates, or may be mixtures of two or more. Further, among these compounds, calcium acetate hydrate, strontium acetate 0.5 hydrate, or barium acetate are more preferable.

Examples of a dispersion medium for dispersing or a solvent for dissolving the alkaline earth metal compound include at least one selected from the group consisting of water, formic acid, methanol, ethanol, 1-propanol, 2-propanol, butanol, acetic acid, dimethylsulfoxide, N,N-dimethylformamide, acetonitrile, acetone, tetrahydrofuran, methylene chloride, ethyl acetate, chloroform, diethyl ether, toluene, benzene, and hexane, and water is preferable.

The amount of the alkaline earth metal compound to be applied in the application step A3 is preferably 0.05 to 5.0 parts by mass in terms of oxide per 100 parts by mass of the alumina sintered body raw material.

When the amount of the alkaline earth metal compound to be applied is 0.05 parts by mass or more in terms of oxide per 100 parts by mass of the alumina sintered body raw material, the content of the alkaline earth metal in the outer layer of the alumina sintered body as a final product can be made a sufficient value. From the same point of view, the amount of the alkaline earth metal compound to be applied is more preferably 0.10 parts by mass or more, further preferably 0.20 parts by mass or more, in terms of oxide, per 100 parts by mass of the alumina sintered body raw material.

When the amount of the alkaline earth metal compound to be applied is 5.0 parts by mass or less in terms of oxide per 100 parts by mass of the alumina sintered body raw material, penetration of an excess amount of the alkaline earth metal into the alumina sintered body can be suppressed, in addition to the fact that when the coating amount is small, the manufacturing cost is lowered. From the same point of view, the amount of the alkaline earth metal compound to be applied is more preferably 4.0 parts by mass or less, further preferably 3.0 parts by mass or less, in terms of oxide, per 100 parts by mass of the alumina sintered body raw material.

<Second Heat Treatment Step A4>

In the second heat treatment step A4, the alumina sintered body raw material to which the alkaline earth metal compound has been applied is preferably subjected to heat treatment at a heat treatment temperature of 1200° C. or more. The heat treatment at a heat treatment temperature of 1200° C. or more enables the alkaline earth metal present on the surface of the alumina sintered body to be diffused or reacted in the alumina sintered body, so that an outer layer having a high content of the alkaline earth metal is formed on the surface of the alumina sintered body. Thereby, the outer layer having high toughness is formed in the alumina sintered body. From this reason, the heat treatment temperature is more preferably 1300° C. or more, further preferably 1400° C. or more.

Further, the heat treatment temperature in the second heat treatment step A4 is preferably 1800° C. or less. The heat treatment at a heat treatment temperature of 1800° C. or less enables necking between the alumina sintered bodies to be suppressed, so that the alumina sintered body having a desired shape can be obtained. From this reason, the heat treatment temperature is more preferably 1750° C. or less, further preferably 1700° C. or less.

The alumina sintered body of this embodiment is obtained by this step. Further, the heat treatment atmosphere may be any one of atmospheric air, inert atmosphere and vacuum, preferably atmospheric air. Any combination of the firing temperature and the firing atmosphere above can be applied.

In this step, the retention time of the heat treatment temperature is preferably 5 minutes or more. The alkaline earth metal present on the surface of the alumina sintered body can be diffused or reacted in the alumina sintered body by setting the retention time of the heat treatment temperature to 5 minutes or more. Further, necking between the alumina sintered bodies can be suppressed by setting the retention time of the heat treatment temperature to 300 minutes or less. From this point of view, the retention time of the heat treatment temperature is more preferably 10 to 180 minutes, further preferably 30 to 120 minutes.

Examples of the heat treatment method in this step include a method for subjecting the alumina sintered body raw material put in a container such as a sagger to heat treatment in an electric furnace such as a muffle furnace or a tunnel-type continuous firing furnace, and a method for subjecting the alumina sintered body raw material directly to heat treatment in a firing apparatus such as a rotary kiln.

[3. Method for Producing Alumina Sintered Body 2]

FIG. 2 is a flowchart showing an another example of a method for producing an alumina sintered body of the embodiment of the present invention. This production method includes a molding step B1 of fabricating an alumina compact from alumina powder, an application step B2 of applying an alkaline earth metal compound to the surface of the alumina compact obtained by the molding step B1, and a heat treatment step B3 of subjecting the alumina compact to which the alkaline earth metal compound has been applied to heat treatment. In this production method, an unsintered alumina compact can be used as the alumina compact that is subjected to heat treatment in the heat treatment step B3, and therefore there is no need to produce or obtain an alumina sintered body raw material, so that the production cost can be reduced. In an example of the production method, the molding step B1 may be omitted when an alumina compact can be prepared in advance. In an example of the production method, the molding step B1 is the same as the molding step A1, and therefore the application step B2 and the heat treatment step B3 will be described herein.

<Application Step B2>

Examples of the method for applying the alkaline earth metal compound to the surface of the alumina compact in the application step B2 include a method for spraying a dispersion or a solution of the compound to the alumina compact. According to this method, it is easy to control the amount of the alkaline earth metal compound to be applied to the alumina compact, and it is easy to make the application amount uniform. The method for applying the alkaline earth metal compound to the surface of the alumina compact is not limited thereto and needs only to enable the alkaline earth metal compound to deposit on the surface of the alumina compact, as in brush coating, dipping, and the like. Preferable examples of the calcium compounds, the strontium compounds, and the barium compounds, and the dispersion medium or the solvent to be used are the same as in the application step A3.

In the application step B2, the amount of the alkaline earth metal compound to be applied is preferably 0.05 to 5.0 parts by mass in terms of oxide per 100 parts by mass of the alumina compact.

When the amount of the alkaline earth metal compound to be applied is 0.05 parts by mass or more in terms of oxide per 100 parts by mass of the alumina sintered body raw material, the content of the alkaline earth metal in the outer layer of the alumina sintered body as a final product can be made a sufficient value. From the same point of view, the amount of the alkaline earth metal compound to be applied is more preferably 0.10 parts by mass or more, further preferably 0.20 parts by mass or more, in terms of oxide, per 100 parts by mass of the alumina sintered body raw material.

When the amount of the alkaline earth metal compound to be applied is 5.0 parts by mass or less in terms of oxide per 100 parts by mass of the alumina compact, penetration of an excess amount of the alkaline earth metal into the alumina sintered body can be suppressed, in addition to the reason of the production cost. From the same point of view, the amount of the alkaline earth metal compound to be applied is more preferably 4.0 parts by mass or less, further preferably 3.0 parts by mass or less, in terms of oxide, per 100 parts by mass of the alumina sintered body raw material.

<Heat Treatment Step B3>

In the heat treatment step B3, the alumina compact to which the alkaline earth metal compound has been applied is preferably subjected to heat treatment at a heat treatment temperature of 1200° C. or more. The heat treatment at a heat treatment temperature of 1200° C. or more can allow alumina crystal grains to sufficiently grow on the surface of the alumina. From this reason, the heat treatment temperature is more preferably 1300° C. or more, further preferably 1400° C. or more.

Further, the heat treatment temperature in the second heat treatment step B3 is preferably 1800° C. or less. Necking between the alumina sintered bodies is suppressed by subjecting to heat treatment at a heat treatment temperature of 1800° C. or less, so that the alumina sintered body having a desired shape can be obtained. From this reason, the heat treatment temperature is more preferably 1750° C. or less, further preferably 1700° C. or less.

Further, the heat treatment atmosphere may be any one of atmospheric air, inert atmosphere and vacuum, preferably atmospheric air. Any combination of the firing temperature and the firing atmosphere above can be applied. Specific examples of the heat treatment method in this step are as described above in the second heat treatment step A4. The alumina sintered body of this embodiment is obtained by this step.

In this step, the retention time of the heat treatment temperature is preferably 5 minutes or more. The alkaline earth metal present on the surface of the alumina sintered body can be diffused or reacted in the alumina sintered body by setting the retention time of the heat treatment temperature to 5 minutes or more. Further, necking between the alumina sintered bodies can be suppressed by setting the retention time of the heat treatment temperature to 300 minutes or less. From this point of view, the retention time of the heat treatment temperature is more preferably 10 to 180 minutes, further preferably 30 to 120 minutes.

[4. Abrasive Grains Using Alumina Sintered Body of the Embodiment]

In the case of using the alumina sintered body as abrasive grains, the surface that directly contacts workpieces separates from the sintered body upon breakage to be lost and worn out. Further, when cracks occur on the surface of the alumina sintered body, the surface is lost as a large fragment, thus accelerating the wear rate. Therefore, when the surface of the alumina sintered body has high toughness, the wear resistance is improved. The inside of the alumina sintered body needs to receive the force applied to the surface and efficiently transmit the force to the surface that contacts workpieces. Further, plastic deformation inside the alumina sintered body affects the performance of the alumina sintered body. Therefore, the inside of the alumina sintered body preferably has high hardness and high strength.

The outer layer of the alumina sintered body of this embodiment contains the alkaline earth metal and has high toughness, so that the wear resistance of the alumina sintered body is improved. Further, the amount of the alkaline earth metal contained in the inner layer is smaller than in the outer layer, so that the inner layer has high strength and high hardness that are originally possessed by the alumina sintered body. Therefore, the inner layer not only can efficiently transmit the force applied to the alumina sintered body to the outer layer that contacts workpieces but also can suppress a reduction in performance due to plastic deformation of the alumina sintered body. Therefore, the alumina sintered bodies of the embodiments are suitable, for example, for applications of grinding tools, applications of grinding abrasive materials such as abrasive materials, grinding wheels, and abrasive cloth papers, and are particularly suitable for applications as abrasive grains of grinding wheels for heavy grinding in the iron and steel industry. Heavy grinding is a grinding method to remove surface defects of steel billets (such as slabs, blooms, and billets) and has a feature that the grinding load and the grinding speed are exceptionally high. The load applied to abrasive grains is 980 N or more and may be over 9.8 kN, depending on the circumstances. Abrasive grains used with such a high load applied are called heavy-grinding abrasive grains.

The shape of the abrasive grains is not specifically limited, but when it is a circular cylindrical shape, molding is easy, and a grinding wheel having more excellent grinding performance is obtained.

The alumina sintered body as abrasive grains can be produced, for example, by [Method for producing alumina sintered body 1] or [Method for producing alumina sintered body 2] described above. In this case, an extrusion granulation method is preferably used as a method for obtaining an alumina compact. The extrusion granulation method is a granulation method to obtain pellets by adding a liquid to raw material powder, followed by kneading, to fabricate a cake of raw material powder and extruding the cake of raw material powder from dies having a lot of open holes. In the extrusion granulation method, a screw extrusion granulator can be, for example, used. In this granulation method, alumina pellets of a circular cylindrical shape can be obtained. The alumina pellets obtained may be used as an alumina compact as they are, may be used as an alumina compact after equalizing the lengths of the alumina pellets using a disintegrating granulator or the like, or may be used as an alumina compact after further making the alumina pellets into a spherical shape using a spherical granulator or the like. The size of the alumina compact is appropriately selected based on the target grain size of abrasive grains. Examples of the grain size of abrasive grains include a grain size defined in JIS R6111 (artificial abrasive material). When advanced preparation is possible, such as when an alumina compact having a desired shape as a grinding wheel can be obtained, the step of fabricating the alumina compact may be omitted.

[5. Grinding Wheel Using Alumina Sintered Body of the Embodiment]

A grinding wheel having a high grinding ratio can be obtained by fixing a layer of abrasive grains using the alumina sintered body of the embodiment to the working surface. Examples of the method for fixing the abrasive grains to the working surface of the grinding wheel include methods using resin bonds, vitrified bonds, metal bonds, and electrodeposition. Further, examples of materials for a base metal include steels, stainless steel alloys, and aluminum alloys, and the method for fixing abrasive grains is selected depending on the use. The alumina sintered body of the embodiment has good resin affinity, and thus a grinding wheel in which abrasive grains hardly fall off even in heavy grinding can be produced by fixing it to the grinding wheel using a resin bond containing a phenolic resin as a main component.

EXAMPLES

Hereinafter, the present invention will be described more specifically by way of Examples, but the present invention is not limited to the following Examples.

[1. Fabrication of Alumina Sintered Body (Abrasive Grains)]

Alumina sintered bodies of Examples 1 to 10 and Comparative Examples 1 to 3 were fabricated as follows. In these Examples and Comparative Examples, the alkaline earth metal compound applied to the alumina sintered body raw material, the oxide into which the alkaline earth metal was converted, and the content of the alkaline earth metal in terms of oxide based on the total amount of the alumina sintered body raw material and the alkaline earth metal in terms of oxide are as shown in Table 1. In the following Examples and Comparative Examples, there is no step to remove the alkaline earth metal after it is applied as a compound, and therefore the content of the alkaline earth metal in the alumina sintered body produced by heat treatment in terms of oxide may be considered as the content of the alkaline earth metal in terms of oxide shown in Table 1.

TABLE 1

| | Alumina sintered body (entirety) | | | Outer layer | | | | |
| --- | --- | --- | --- | --- | --- | --- | --- | --- |
| | Alkaline earth metal compound | Conversion oxide | Content of alkaline earth metal in terms of oxide/mass % | Thickness/μm | Content of alkaline earth metal in terms of oxide/mass % | Coverage/% | Mass on sieve/g | Vickers hardness/Hv |
| Example 1 | Calcium acetate | CaO | 0.16 | 64 | 10.7 | 9 | 8.40 | 17.9 |
| Example 2 | Calcium acetate | CaO | 0.32 | 34 | 7.8 | 33 | 8.59 | 17.4 |
| Example 3 | Calcium acetate | CaO | 0.63 | 20 | 8.8 | 58 | 8.65 | 18.2 |
| Example 4 | Calcium acetate | CaO | 0.94 | 59 | 8.9 | 51 | 8.70 | 17.2 |
| Example 5 | Strontium acetate | SrO | 0.48 | 11 | 12.3 | 33 | 8.25 | 18.0 |
| Example 6 | Strontium acetate | SrO | 0.95 | 28 | 13.8 | 88 | 8.15 | 17.8 |
| Example 7 | Strontium acetate | SrO | 1.41 | 19 | 13.5 | 97 | 8.19 | 17.9 |
| Example 8 | Barium acetate | BaO | 0.60 | 7 | 12.2 | 90 | 8.48 | 17.8 |
| Example 9 | Barium acetate | BaO | 1.18 | 27 | 13.0 | 97 | 8.83 | 18.4 |

TABLE 1-continued

| | | | | | | | | |
|---|---|---|---|---|---|---|---|---|
| Example 10 | Barium acetate | BaO | 1.74 | 30 | 16.3 | 98 | 8.87 | 17.8 |
| Comparative Example 1 | — | — | — | — | — | — | 7.81 | 17.7 |
| Comparative Example 2 | — | — | — | — | — | — | 7.87 | 17.4 |

| | Alumina sintered body (entirety) | | | Outer layer | | | | |
|---|---|---|---|---|---|---|---|---|
| | Magnesium compound | Conversion oxide | Content of magnesium in terms of oxide/mass % | Thickness/µm | Content of magnesium in terms of oxide/mass % | Coverage/% | Mass on sieve/g | Vickers hardness/Hv |
| Comparative Example 3 | Magnesium acetate | MgO | 0.38 | — | 15.1 | — | 7.85 | 17.6 |

Example 1

An alumina sintered body raw material (product number SR-1, manufactured by Showa Denko K.K.) of a circular cylindrical shape with a grain size of F12 (JIS R6001) was prepared. The alumina sintered body raw material was obtained by extrusion of alumina raw material powder ($Al_2O_3$: 99.2 mass %, $SiO_2$: 0.2 mass % as unavoidable impurities, $Fe_2O_3$: 0.1 mass %, and the remainder was minor components) into a circular cylindrical shape with a diameter of 1.8 mm and an average length (based on the number) of 4.0 mm by the extrusion granulation method, followed by firing.

0.50 g of calcium acetate hydrate (manufactured by Wako Pure Chemical Industries, Ltd.) was dissolved in 10.0 mL of distilled water to fabricate a calcium acetate aqueous solution. 100.0 g of the alumina sintered body raw material was weighed into an evaporating dish. All the calcium acetate aqueous solution was uniformly sprayed to the surface of the alumina sintered body raw material, and thereby calcium acetate was applied to the surface of the alumina sintered body raw material. The proportion of the amount of calcium obtained by converting the mass of calcium acetate applied in terms of CaO per 100 parts by mass of the alumina sintered body raw material before the application of calcium acetate was 0.16 parts by mass. Accordingly, the content of calcium in terms of CaO based on the total of the alumina sintered body raw material and calcium in terms of CaO was 0.16 mass %.

The alumina sintered body raw material to which calcium acetate was applied was put into an electric furnace, in which the temperature was raised from room temperature to 1700° C. over 200 minutes, and the heat treatment temperature at 1700° C. was retained for 1 hour, to fabricate an alumina sintered body. The heat treatment atmosphere was atmospheric air.

Further, the alumina sintered body produced was ground using a ball mill into powder, and X-ray diffraction measurement was performed, using "X' pertPRO" manufactured by PANalytical B.V. as a measuring device, a copper target, and a Cu-Kα1 line, under conditions of a tube voltage of 45 kV, a tube current of 40 mA, a measurement range of 2θ=20 to 100 deg, a sampling width of 0.0167 deg, and a scanning speed of 1.1 deg/min. As a result, a peak derived from $CaAl_{12}O_{19}$ (x=y=z=0 in formula (1)) was observed.

Example 2

An alumina sintered body was fabricated in the same manner as in Example 1 except that 1.0 g of calcium acetate hydrate (manufactured by Wako Pure Chemical Industries, Ltd.) was dissolved in 10.0 mL of distilled water to fabricate a calcium acetate aqueous solution. The proportion of the amount of calcium obtained by converting the mass of calcium acetate applied in terms of CaO per 100 parts by mass of the alumina sintered body raw material before the application of calcium acetate was 0.32 parts by mass. Accordingly, the content of calcium in terms of CaO based on the total of the alumina sintered body raw material and calcium in terms of CaO was 0.32 mass %. Further, X-ray diffraction measurement was performed in the same manner as in Example 1. As a result, a peak derived from $CaAl_{12}O_{19}$ (x=y=z=0 in formula (1)) was observed.

Example 3

An alumina sintered body was fabricated in the same manner as in Example 1 except that 2.0 g of calcium acetate hydrate (manufactured by Wako Pure Chemical Industries, Ltd.) was dissolved in 10.0 mL of distilled water to fabricate a calcium acetate aqueous solution. The proportion of the amount of calcium obtained by converting the mass of calcium acetate applied in terms of CaO per 100 parts by mass of the alumina sintered body raw material before the application of calcium acetate was 0.63 parts by mass. Accordingly, the content of calcium in terms of CaO based on the total of the alumina sintered body raw material and calcium in terms of CaO was 0.63 mass %. Further, X-ray diffraction measurement was performed in the same manner as in Example 1. As a result, a peak derived from $CaAl_{12}O_{19}$ (x=y=z=0 in formula (1)) was observed.

Example 4

An alumina sintered body was fabricated in the same manner as in Example 1 except that 3.0 g of calcium acetate hydrate (manufactured by Wako Pure Chemical Industries, Ltd.) was dissolved in 10.0 mL of distilled water to fabricate a calcium acetate aqueous solution. The proportion of the amount of calcium obtained by converting the mass of calcium acetate applied in terms of CaO per 100 parts by mass of the alumina sintered body raw material before the application of calcium acetate was 0.95 parts by mass. Accordingly, the content of calcium in terms of CaO based on the total of the alumina sintered body raw material and calcium in terms of CaO was 0.94 mass %. Further, X-ray diffraction measurement was performed in the same manner as in Example 1. As a result, a peak derived from $CaAl_{12}O_{19}$ (x=y=z=0 in formula (1)) was observed.

Example 5

An alumina sintered body was fabricated in the same manner as in Example 1 except that a strontium acetate aqueous solution fabricated by dissolving 1.0 g of strontium acetate 0.5 hydrate (manufactured by Wako Pure Chemical Industries, Ltd.) in 10.0 mL of distilled water was used instead of the calcium acetate aqueous solution. The proportion of the amount of strontium obtained by converting the mass of strontium acetate applied in terms of SrO per 100 parts by mass of the alumina sintered body raw material before the application of strontium acetate was 0.48 parts by mass. Accordingly, the content of strontium in terms of SrO based on the total of the alumina sintered body raw material and strontium in terms of SrO was 0.48 mass %. Further, X-ray diffraction measurement was performed in the same manner as in Example 1. As a result, a peak derived from $SrAl_{12}O_{19}$ (x=y=z=0 in formula (1)) was observed.

Example 6

An alumina sintered body was fabricated in the same manner as in Example 1 except that a strontium acetate aqueous solution fabricated by dissolving 2.0 g of strontium acetate 0.5 hydrate (manufactured by Wako Pure Chemical Industries, Ltd.) in 10.0 mL of distilled water was used instead of the calcium acetate aqueous solution. The proportion of the amount of strontium obtained by converting the mass of strontium acetate applied in terms of SrO per 100 parts by mass of the alumina sintered body raw material before the application of strontium acetate was 0.96 parts by mass. Accordingly, the content of strontium in terms of SrO based on the total of the alumina sintered body raw material and strontium in terms of SrO was 0.95 mass %. Further, X-ray diffraction measurement was performed in the same manner as in Example 1. As a result, a peak derived from $SrAl_{12}O_{19}$ (x=y=z=0 in formula (1)) was observed.

Example 7

An alumina sintered body was fabricated in the same manner as in Example 1 except that a strontium acetate aqueous solution fabricated by dissolving 3.0 g of strontium acetate 0.5 hydrate (manufactured by Wako Pure Chemical Industries, Ltd.) in 10.0 mL of distilled water was used instead of the calcium acetate aqueous solution. The proportion of the amount of strontium obtained by converting the mass of strontium acetate applied in terms of SrO per 100 parts by mass of the alumina sintered body raw material before the application of strontium acetate was 1.43 parts by mass. Accordingly, the content of strontium in terms of SrO based on the total of the alumina sintered body raw material and strontium in terms of SrO was 1.41 mass %. Further, X-ray diffraction measurement was performed in the same manner as in Example 1. As a result, a peak derived from $SrAl_{12}O_{19}$ (x=y=z=0 in formula (1)) was observed.

Example 8

An alumina sintered body was fabricated in the same manner as in Example 1 except that a barium acetate aqueous solution fabricated by dissolving 1.0 g of barium acetate (manufactured by Wako Pure Chemical Industries, Ltd.) in 10.0 mL of distilled water was used instead of the calcium acetate aqueous solution. The proportion of the amount of barium obtained by converting the mass of barium acetate applied in terms of BaO per 100 parts by mass of the alumina sintered body raw material before the application of barium acetate was 0.60 parts by mass. Accordingly, the content of barium in terms of BaO based on the total of the alumina sintered body raw material and barium in terms of BaO was 0.60 mass %. Further, X-ray diffraction measurement was performed in the same manner as in Example 1. As a result, a peak derived from $BaAl_{12}O_{19}$ (x=y=z=0 in formula (1)) was observed.

Example 9

An alumina sintered body was fabricated in the same manner as in Example 1 except that a barium acetate aqueous solution fabricated by dissolving 2.0 g of barium acetate (manufactured by Wako Pure Chemical Industries, Ltd.) in 10.0 mL of distilled water was used instead of the calcium acetate aqueous solution. The proportion of the amount of barium obtained by converting the mass of barium acetate applied in terms of BaO per 100 parts by mass of the alumina sintered body raw material before the application of barium acetate was 1.19 parts by mass. Accordingly, the content of barium in terms of BaO based on the total of the alumina sintered body raw material and barium in terms of BaO was 1.18 mass %. Further, X-ray diffraction measurement was performed in the same manner as in Example 1. As a result, a peak derived from $BaAl_{12}O_{19}$ (x=y=z=0 in formula (1)) was observed.

Example 10

An alumina sintered body was fabricated in the same manner as in Example 1 except that a barium acetate aqueous solution fabricated by dissolving 3.0 g of barium acetate (manufactured by Wako Pure Chemical Industries, Ltd.) in 10.0 mL of distilled water was used instead of the calcium acetate aqueous solution. The proportion of the amount of barium obtained by converting the mass of barium acetate applied in terms of BaO per 100 parts by mass of the alumina sintered body raw material before the application of barium acetate was 1.77 parts by mass. Accordingly, the content of barium in terms of BaO based on the total of the alumina sintered body raw material and barium in terms of BaO was 1.74 mass %. Further, X-ray diffraction measurement was performed in the same manner as in Example 1. As a result, a peak derived from $BaAl_{12}O_{19}$ (x=y=z=0 in formula (1)) was observed.

Comparative Example 1

An alumina sintered body of Comparative Example 1 was fabricated in the same manner as in Example 1 except that the alkaline earth metal compound was not applied.

Comparative Example 2

An alumina sintered body raw material (product number SR-1, manufactured by Showa Denko K.K.) of a circular cylindrical shape with a grain size of F12 (JIS R6001), that is, the alumina sintered body raw material used in Example 1 was used as it was as an alumina sintered body of Comparative Example 2. That is, the difference from Example 1 was that the alumina sintered body was not subjected to heat treatment in Comparative Example 2.

Comparative Example 3

An alumina sintered body was fabricated in the same manner as in Example 1 except that a magnesium acetate aqueous solution fabricated by dissolving 2.0 g of magnesium acetate (manufactured by Wako Pure Chemical Industries, Ltd.) in 10.0 mL of distilled water was used instead of the calcium acetate aqueous solution. The proportion of the amount of magnesium obtained by converting the mass of magnesium acetate applied in terms of MgO per 100 parts by mass of the alumina sintered body raw material before the application of magnesium acetate was 0.38 parts by mass. Accordingly, the content of magnesium in terms of MgO based on the total of the alumina sintered body raw material and magnesium in terms of MgO was 0.38 mass %. Further, X-ray diffraction measurement was performed in the same manner as in Example 1. However, a peak derived from the compound represented by formula (1) was not observed.

[2. Analysis of Alumina Sintered Body]

The configurations of the alumina sintered bodies fabricated in Examples 1 to 10 and Comparative Examples 1 to 3 were analyzed as follows. Table 1 above shows the analysis results thereof. For Comparative Examples 1 and 2, the measurement results are shown by the symbol "-" since no outer layers were formed in these Comparative Examples.

<Confirmation of Structure (Inner Layer and Outer Layer) of Alumina Sintered Body>

The element concentration on fracture surfaces of the alumina sintered bodies fabricated in Examples 1 to 10 was measured using an energy dispersive X-ray spectrometer (EDS) (model name JED-2300, manufactured by JEOL Ltd.) mounted on a scanning electron microscope (SEM) (model name "JSM-6510V" manufactured by JEOL Ltd).

As an example of the measurement results, FIG. 3 is a SEM image of the fracture surface of the alumina sintered body of Example 3 and a graph showing the element concentration of the alkaline earth metal (calcium) detected by EDS at points corresponding to the image. In the figure, the black horizontal line indicates the detection point of the element concentration of calcium, and the black polygonal line indicates the element concentration of calcium detected. As seen from the graph, there is a portion where the element concentration of calcium is significantly high in the vicinity of the surface of the alumina sintered body. It could be confirmed from this that the outer layer in which the content of calcium was higher than in the inner layer was formed in the alumina sintered body of Example 3. Also for other Examples, it was confirmed that the outer layer was formed in the same manner. The concentration of strontium as the alkaline earth metal was measured for Examples 5 to 7 and the concentration of barium as the alkaline earth metal was measured for Examples 8 to 10.

<Thickness of Outer Layer>

From the measurement of the element concentration of the alkaline earth metals on fracture surfaces of the aforementioned alumina sintered bodies, the thickness of the outer layers of the alumina sintered bodies fabricated in Examples 1 to 10 was measured. Specifically, there was a section where the content of the alkaline earth metal element drastically varied (became significantly higher on the surface side than inside) around the surface of the alumina sintered body, for example, as in FIG. 3. Further, the concentration of the alkaline earth metal element drastically decreased outside the alumina sintered body, with the surface of the alumina sintered body serving as a boundary. Therefore, the interval between the midpoint of the section in which the concentration of the alkaline earth metal element became significantly higher on the surface side than inside and the surface of alumina was measured. This measurement was performed for 20 grains of the alumina sintered body for each Example, and the average of the measured values thereof was taken as the thickness of the outer layer. Table 1 shows the thicknesses of the outer layers thus measured.

<Content of Alkaline Earth Metal in Outer Layer>

The content of the alkaline earth metals in terms of oxide in the outer layers of the alumina sintered bodies of Examples 1 to 10 and Comparative Example 3 was measured as follows. Table 1 shows the measured values thereof.

Using EDS, the element concentration of the alkaline earth metals on the fracture surfaces of the alumina sintered bodies was measured for 20 grains at 2 points on the outer layer per grain of each alumina sintered body (40 points in total). From the element concentration of the alkaline earth metals measured, the content of the alkaline earth metals in terms of oxide was calculated. The average of the content values calculated was taken as the content of the alkaline earth metals in the outer layers.

<Coverage by Outer Layer>

The proportion of the area covered by the outer layer to the surface area of the inner layer in the alumina sintered bodies of Examples 1 to 10, that is, the coverage by the outer layer was calculated based on the element mapping obtained using EDS. Table 1 shows the coverage by the outer layer thus calculated. Further, the method for calculating the coverage by the outer layer of the alumina sintered body of Example 3 will be described below as an example.

FIG. 4 is an element mapping image by EDS of the fracture surface of the alumina sintered body of Example 3. In this image, the white portion indicates the existence region of calcium. In this image, the length of the outer circumference of the fracture surface and the length of the existence region of calcium formed on the outer circumference were measured. {(length of existence region of calcium)/(length of outer circumference)} (%) was calculated from the measured values. The same element mapping was performed for 20 grains of the alumina sintered body, and the aforementioned proportion was calculated in the same manner. The average of the proportions calculated was taken as the coverage by the outer layer.

[3. Evaluation of Alumina Sintered Body]

<Evaluation of Wear Resistance>

The wear resistance of the alumina sintered bodies fabricated in Examples 1 to 10 and Comparative Examples 1 to 3 was evaluated regarding them as having a circular cylindrical shape with a grain size of F12 defined in JIS R6001-1.

First, 100 g of a sintered body was sieved using a rotating and tapping tester together with a F12 test sieve defined in JIS R6001-1 (which will be hereinafter referred to as "F12 sieve") for 10 minutes, and 10.5 g of the sintered body remaining on the 3rd stage of the sieve was used as a measurement sample.

10.5 g of the measurement sample was put into a steel ball mill container (with 3 lifters) with an inner diameter of 115×110 mm in which 1500 g of chromium steel balls with a diameter of 20 mm had been put. The ball mill was uniaxially rotated at a rotational speed of 95 times/minute for 5 minutes, to obtain a ground sample.

The ground sample was sieved using the F12 sieve for 5 minutes, and the mass of the ground sample remaining on the 1st to 4th stage of the sieve (mass on the sieve) was taken as x (g). In this evaluation, a larger value of the mass on the sieve indicates that the wear resistance of the sample is higher. Table 1 shows the evaluation results.

It turned out that the samples of Examples 1 to 10 had larger values of the mass on the sieve than the samples of Comparative Examples 1 to 3, thus having excellent wear resistance.

<Vickers Hardness>

Using model name "MVK-VL, Hardness Tester" manufactured by Akashi Corporation as a device, the measurement was performed under conditions of a load of 0.98 N and an injection time of an indenter of 10 seconds, and the average value of the measured values at 15 points was taken as a micro-Vickers hardness. Table 1 shows the measurement results. It was seen from Table 1 that the alumina sintered bodies of Examples 1 to 10 had an equivalent hardness to the alumina sintered bodies of Comparative Examples 1 to 3.

<Resin Affinity>

Resin formed articles containing the alumina sintered bodies according to Examples 3 and 9 and Comparative Example 2 were fabricated, and the 3-point bending strength of the resin formed articles fabricated was measured, to evaluate the resin affinity of the alumina sintered bodies.

The method for fabricating the resin formed articles used for the evaluation will be described. First, 0.0097 g of XIAMETER® OFS-6020 SILANE (Dow Corning Toray Co., Ltd.) was put into 10 g of water, followed by stirring using a magnetic stirrer for 5 minutes for hydrolysis, to fabricate a silane coupling agent aqueous solution. 500 g of each alumina sintered body fabricated in Examples 3 and 9 and Comparative Example 2 was weighed out, and a silane coupling agent aqueous solution was added to each, followed by mixing within a zipper bag until the surface of the alumina sintered body was uniformly wet. Thereafter, the alumina sintered body was dried at 80° C. for 10 hours, to fabricate a silane coupling-treated alumina sintered body.

Thereafter, 61.5 g of the silane coupling-treated alumina sintered body, 15.5 g of cryolite (manufactured by KANTO CHEMICAL CO., INC.), and 24.0 g of iron sulfide (manufactured by Hosoi Chemical Industry Co., Ltd.) were put into a 200-ml disposable cup (manufactured by AS ONE Corporation), followed by mixing using MAZERUSTAR® (KK-400W, manufactured by KURABO INDUSTRIES LTD.) with the revolution speed set to 4, the rotation speed set to 9, and the operation time set to 60 seconds. Thereafter, 8.0 g of SHONOL® BRL-2534 was added thereto, followed by uniform mixing twice using MAZERUSTAR under conditions of a revolution speed of 4, a rotation speed of 9, and an operation time of 60 seconds, and thereafter 14.0 g of SHONOL® BRP-8152 was added thereto, followed by uniform mixing using MAZERUSTAR under conditions of a revolution speed of 4, a rotation speed of 9, and an operation time of 30 seconds, to fabricate an alumina sintered body mixture (which will be hereinafter referred to as "mixture").

This mixture was put into a die with a width of 26 mm, a length of 150 mm, and a thickness of 50 mm, as product dimensions, and was subjected to hot pressing using a hydraulic forming machine (manufactured by Oji Machine Co., Ltd.) under conditions of a surface pressure of 12.6 GPa, 150° C., and 15 minutes, to fabricate a formed article. The formed article obtained was put into a dryer (model THK33P, manufactured by KATO Inc.), in which the temperature was raised to 120° C. over 8 hours, retained at 120° C. for 4 hours, thereafter raised to 180° C. over 5 hours, retained at 180° C. for 8 hours, and decreased to 60° C. over 11 hours. The product obtained by the aforementioned steps was used as a resin formed article for evaluating the resin affinity.

The method for measuring the 3-point bending strength of the resin formed article will be described. Using Autograph® (AGS-J, manufactured by SHIMADZU CORPORATION) as a measuring device, the measurement was performed under conditions of the distance between external fulcrums L=50 mm, a radius of an indenter of 5 mm, and a test speed of 5 mm/min.

The 3-point bending strength of the resin formed article was calculated by the following formula.

$$\text{(3-point bending strength (MPa))} = 3 \times P \times L / (2 \times w \times t^2)$$

P: Maximum load (N) measured before breakage of resin formed article

L: Distance between external fulcrums (mm) (=50 mm)

w: Width (mm) of resin formed article t: Thickness (mm) of resin formed article

The width (w) and the thickness (t) of the resin formed article were measured using a slide caliper.

Table 2 shows the values determined as the arithmetic average of the measured values obtained with the number of samples n=10 in each of the Examples and the Comparative Example. A larger value of the 3-point bending strength of the resin formed article indicates a better resin affinity of the alumina sintered body, where it is considered that shedding of abrasive grains from the grinding wheel hardly occurs during grinding.

TABLE 2

| | 3-point bending strength/MPa |
|---|---|
| Example 3 | 438 |
| Example 9 | 456 |
| Comparative Example 2 | 356 |

[3. Effects of Examples]

As shown in Table 1, the alumina sintered bodies of Examples 1 to 10 have excellent wear resistance as compared with the alumina sintered bodies of Comparative Examples 1 to 3. Further, the alumina sintered bodies of Examples 1 to 10 have an equivalent hardness to the alumina sintered bodies of Comparative Examples 1 to 3. Comparative Example 2 is a commercially available alumina sintered body and has high hardness that is originally possessed by alumina sintered bodies. That is, the alumina sintered bodies according to Examples 1 to 10 have excellent wear resistance while maintaining high hardness that is originally possessed by alumina sintered bodies. Further, since silicon is not added in the production process of Examples 1 to 10, silicon contained in the alumina sintered body produced is only components derived from unavoidable impurities in the raw material.

Accordingly, it was found that an alumina sintered body comprising an inner layer comprising alumina crystal grains and an outer layer covering at least a part of the inner layer from outside, having a higher content of an alkaline earth metal than the inner layer, and comprising alumina crystal grains, wherein the content of the alkaline earth metal contained in the outer layer is 1.0 to 30.0 mass % in terms of oxide, the alumina sintered body being free from silicon except unavoidable impurities had high hardness and excellent wear resistance.

Further, it was also found from Table 3 that such an alumina sintered body had good resin affinity.

The invention claimed is:

1. An alumina sintered body comprising:
   an inner layer comprising alumina crystal grains; and
   an outer layer covering at least a part of the inner layer from outside, having a higher content of an alkaline earth metal than the inner layer, and comprising alumina crystal grains, wherein
   the content of the alkaline earth metal contained in the outer layer is 1.0 to 30.0 mass % in terms of oxide,
   the alumina sintered body being free from silicon except unavoidable impurities.

2. The alumina sintered body according to claim 1, wherein
   a content of the alkaline earth metal in the entire alumina sintered body is 0.05 to 4.8 mass % in terms of oxide.

3. The alumina sintered body according to claim 1, wherein
   the outer layer has a thickness of 1 to 100 μm.

4. The alumina sintered body according to claim 1, wherein
   the outer layer covers 25% or more of the surface of the inner layer.

5. The alumina sintered body according to claim 1, comprising:
   a compound represented by formula (1) below:

$$M_{1+x}Al_{12+y}O_{19+z} \quad (1)$$

wherein M is at least one selected from the group consisting of calcium, strontium and barium, and $-0.3<x<0.3$, $-1.5<y<1.5$, $-2.0<z<2.0$, and $2x+3y=2z$ are satisfied.

6. An abrasive grain comprising an alumina sintered body, wherein the alumina sintered body comprises:
   an inner layer comprising alumina crystal grains; and
   an outer layer covering at least a part of the inner layer from outside, having a higher content of an alkaline earth metal than the inner layer, and comprising alumina crystal grains, wherein
   the content of the alkaline earth metal contained in the outer layer is 1.0 to 30.0 mass % in terms of oxide,
   the alumina sintered body being free from silicon except unavoidable impurities.

7. A grinding wheel having abrasive grains fixed to a working surface, wherein the abrasive grains comprise an alumina sintered body comprising:
   an inner layer comprising alumina crystal grains; and
   an outer layer covering at least a part of the inner layer from outside, having a higher content of an alkaline earth metal than the inner layer, and comprising alumina crystal grains, wherein
   the content of the alkaline earth metal contained in the outer layer is 1.0 to 30.0 mass % in terms of oxide,
   the alumina sintered body being free from silicon except unavoidable impurities.

* * * * *